United States Patent Office 3,428,714
Patented Feb. 18, 1969

1

3,428,714
TRIARYL PHOSPHATES
James S. Sconce, Lewiston, James J. Hodan, Williamsville, and William L. Schall, Buffalo, N.Y., assignors to Hooker Chemical Corporation, Niagara, Falls, N.Y., a corporation of New York
No Drawing. Filed May 24, 1965, Ser. No. 458,451
U.S. Cl. 260—966   15 Claims
Int. Cl. C07f 9/08

ABSTRACT OF THE DISCLOSURE

Organic phosphates of the formula

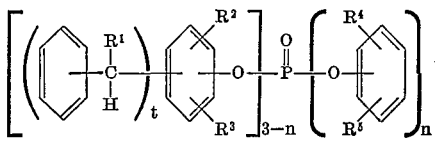

wherein $R^1$ is alkyl of 1 to about 8 carbon atoms; $R^2$, $R^3$, $R^4$, and $R^5$ are independently selected from the group consisting of hydrogen, alkyl of 1 to about 18 carbon atoms, and chlorine; $n$ is from 0 to 2; and $t$ is from 1 to 3. These compounds are especially useful as plasticizers.

---

This invention relates to novel organic phosphates. More particularly, it relates to triaryl phosphates, such as those in which at least one aryl radical contains at least one benzyl or α-alkylbenzyl substituent.

Heretofore, various organic phosphorus compounds have been employed as plasticizers for various synthetic organic compositions of the type exemplified by chloroprene, polyisobutylene, styrene, polyvinyl chloride and the like. These conventional plasticizers normally tend to migrate from the polymer with the passage of time, thus causing eventual embrittlement of the polymers. In addition, conventional plasticizers tend to be ineffective at temperatures much below room temperature.

It is an object of this invention to provide novel organic phosphates which possess improved plasticizing properties. Other objects of the invention will be apparent from the following detailed description.

In accordance with the practice of the invention, it has been discovered that the hereinbefore referred to object can be accomplished by use of the novel compounds of the invention. These may be prepared by reacting phosphorus oxyhalide with 1 to 3 molar proportions of a substituted phenol carrying one or more substituents selected from the group consisting of alkyl, benzyl, α-alkylbenzyl and halogen, molar proportions being based on weight of phosphorus oxyhalide employed, adding to the reaction mixture sufficient molar proportions of a hydroxy compound selected from the group consisting of phenol, alkyl-substituted phenol and halo-substituted phenol, so that the molar proportions of substituted phenol to phosphorus oxyhalide and of hydroxy compound to phosphorus oxyhalide add up to at least 3, thereafter separating the desired phosphate from the reaction mixture. The term "hydroxy compound" is used herein and in the appended claims to describe a group of the phenolic reactants employed in the process of the invention, namely phenol, alkyl-substituted phenol and halo-substituted phenol.

2

The novel organic phosphates of the invention are characterized by the structural formula:

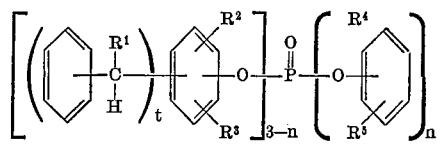

wherein $R^1$ is selected from the group consisting of hydrogen and alkyl of 1 to 8 carbon atoms, preferably of 1 to 4 carbon atoms, $R^2$, $R^3$, $R^4$ and $R^5$ are independently selected from the group consisting of hydrogen, alkyl of 1 to 18 carbon atoms, preferably of 1 to 12 carbon atoms, most preferably of 1 to 9 carbon atoms and halogen, of which chlorine is most preferred, $n$ is from 0 to 2, and $t$ is from 1 to 3. $R^2$, $R^3$, $R^4$ and $R^5$ may be the same or different.

Illustrative examples of the novel organic phosphates which can be prepared by the process of this invention are the following:

Tris(4-α-methylbenzylphenyl) phosphate
Tris(2-α-methylbenzylphenyl) phosphate
Tris[2,4-di(α-methylbenzyl) phenyl] phosphate
Tris[2,6-di(α-methylbenzyl) phenyl] phosphate
Tris[2,4,6-tri(α-methylbenzyl) phenyl] phosphate
Phenyl bis(4-α-methylbenzylphenyl) phosphate
Phenyl bis(2-α-methylbenzylphenyl) phosphate
Tolyl bis(4-α-methylbenzylphenyl) phosphate
Xylyl bis(2-α-methylbenzylphenyl) phosphate
Phenyl bis[2,4-di(α-methylbenzyl) phenyl] phosphate
Tolyl bis[2,6-di(α-methylbenzyl) phenyl] phosphate
Phenyl bis[2,4,6-tri(α-methylbenzyl) phenyl] phosphate
Tolyl bis[2,4,6-tri(α-methylbenzyl) phenyl] phosphate
Phenyl bis(2-α-methylbenzyl-4-chlorophenyl) phosphate
Phenyl bis(2-α-methylbenzyl-4-cresyl) phosphate
Nonylphenyl bis(4-α-methylbenzylphenyl) phosphate
Nonylphenyl bis[2,4-di(α-methylbenzyl) phenyl] phosphate
Nonylphenyl bis[2,4,6-tri(α-methylbenzyl) phenyl] phosphate
Diphenyl 4-α-methylbenzylphenyl phosphate
Ditolyl 2-α-methylbenzylphenyl phosphate
Dixylyl 2,4-di(α-methylbenzyl) phenyl phosphate, and the like.

As the substituted phenols there may be employed compounds of the structural formula:

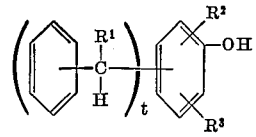

wherein $R^1$, $R^2$, $R^3$ and $t$ are as previously described. Typical illustrative examples of the compounds characterized by the above formula are the following:

Benzyl phenol
4-α-methylbenzyl phenol
2-α-methylbenzyl phenol
2,4-di(α-methylbenzyl) phenol
2,4,6-tri(α-methylbenzyl) phenol
2-α-methylbenzyl-4-chlorophenol
2-α-methylbenzyl-4-methyl phenol
2-α-methylbenzyl-4-nonyl phenol, and the like.

As the hydroxy compounds there may be employed those of the structural formula:

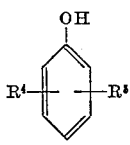

wherein R⁴ and R⁵ are as previously described. Illustrative of the compounds characterized by the above formula are the following: phenol, cresol, xylenol, hexyl phenol, nonyl phenol, decyl phenol, chlorophenol, and the like.

As the phosphorus oxyhalide reactant of the present invention there may be used compounds such as phosphorus oxybromide, phosphorus oxychloride and phosphorus oxyfluoride. Of these, phosphorus oxychloride is most preferred.

In conducting the reaction, the phosphorus oxyhalide is charged to a reaction vessel initially and the other reactants, namely, the substituted phenol and hydroxy compound, are added progressively during the course of the reaction. Usually, the reactants are introduced in desired molar proportions based upon the weight of phosphorus oxyhalide employed. In practice, a stoichiometric quantity of 1 to 3 molar proportions of substituted phenol is added to the phosphorus oxychloride, the number of molar proportions employed depends on the extent of substitution desired. Thereafter, quantities of up to 10 molar proportions of hydroxy compound may be added to complete the substitution. Generally, however, up to 2 molar proportions are employed. It is to be noted that preferably the substituted phenol and hydroxy compound are employed in molar proportions to phosphorus oxyhalide which add up to 3, but it is within the scope of the invention to employ excess hydroxy compound. When such an excess is employed it may be removed by any suitable method, such as distillation or the like. It is also evident that when 3 or more molar proportions of substituted phenol are employed, the hydroxy compound will not be added to the reaction mixture. Accordingly, when a tris α-alkylbenzylphenyl phosphate is desired, the α-alkylbenzylphenyl is reacted in substantially 3 molar proportions based on phosphorus oxychloride employed, and the addition of hydroxy compound is omitted.

It is also within the scope of the invention first to prepare and separate the phosphorohalodate reaction product produced by the reaction of phosphorus oxyhalide and substituted phenol, and thereafter react said product with the hydroxy compound.

Reaction temperatures of from about 20 degrees centigrade to 300 degrees centigrade or more may be employed, the preferred temperatures usually being from about 20 to 250 degrees centigrade. Conveniently, the hydrochloride by-product formed during the reaction may be eliminated at the temperatures hereinbefore mentioned. Reaction times of from as little as about 3 to about 20 hours are in most cases sufficient for completion of the reaction. If desired, a metallic chloride, such as magnesium chloride, aluminum chloride, zinc chloride, and mixtures thereof, may be employed to increase the rate of reaction. When this is done, the metallic chloride may be used in percentages ranging from 0.1 to 5.0 percent, based on the weight of phosphorus oxyhalide employed. Further, the rate of reaction may also be increased by employing elevated reaction temperatures, super-atmospheric pressures or combinations of both. Generally, temperatures ranging from 200 to 300 degrees centigrade and pressures ranging from over 1 atmosphere to 5 atmospheres are sufficient to produce the desired increase in the rate of reaction.

When the reaction is completed, the desired product can be recovered by conventional techniques such as distillation, extraction, crystallization or the like. However, due to the high yields obtainable in many cases, especially when, as previously described, stoichiometric proportions of hydroxy compound and substituted phenol to phosphorus oxyhalide employed in the reaction add up to 3, separation of the desired phosphate from the reaction mixture is not always required for utility of the product and in such cases may be omitted.

The compounds which are provided in accordance with this invention find particular utility as new and useful plasticizers for various synthetic compositions, for example, polyvinyl chloride, synthetic rubber, and the like.

The following examples are presented to illustrate the novel compounds of this invention and their preparation. It is to be understood that the examples are not to be construed as limiting the invention, except as defined in the appended claims. All temperatures are in degrees centigrade and all parts are by weight, unless otherwise mentioned.

EXAMPLE 1

Preparation of diphenyl α-methylbenzylphenyl phosphate

A reaction vessel was charged with 766 parts of phosphorus oxychloride and to this were added 198 parts of 2-α-methylbenzylphenol with stirring. The reactor temperature was raised to and maintained at 110 degrees centigrade so as to reflux the phosphorus oxychloride. Then 6 parts of anhydrous magnesium chloride were added to the mixture, and the reaction was continuously maintained at reflux until 36.5 parts of hydrogen chloride were collected. The excess phosphorus oxychloride was then stripped and the product was distilled at a vapor temperature of 136 degrees centigrade at 0.02 millimeter of absolute pressure. The phosphorodichloridate obtained contained 22.9 percent of chlorine and 9.82 percent of phosphorus. The calculated percentages of these elements for α-methylbenzylphenyl phosphorodichloridate are 22.55 percent chlorine and 9.84 percent of phosphorus. Thereafter, 151 parts of the α-methylbenzylphenyl phosphorodichloridate were added to a flask containing 149 parts of hot phenol. Upon adding 0.1 part of magnesium chloride hydrogen chloride evolution began. The reaction mixture was maintained at 115–145 degrees centigrade until 73 parts of hydrogen chloride were collected. The excess phenol was stripped off and the product was isolated as a residue. The product was found to contain 7.22 percent of phosphorus. The calculated percentage of this element in $C_{26}H_{23}O_4P$ is 7.2 percent. Infrared analysis of diphenyl α-methylbenzylphenyl phosphate was consistent for points of structure such as aryl oxygen phosphorus bond, methyl to carbon bond, and P=O bond.

EXAMPLE 2

Preparation of phenyl bis[2,4,6-tri(α-methylbenzyl) phenyl] phosphate

A reaction vessel equipped with a mechanical stirrer, heating mantle, addition funnel, thermometer, vigreaux column, K-head, condenser, receiver and hydrogen chloride trap, was charged with 212.5 parts of phosphorus oxychloride, and 4 parts of anhydrous magnesium chloride. The reactor was heated to 94 degrees centigrade and the addition of 1174 parts of 2,4,6-tri(α-methylbenzyl) phenol was started. As the addition progressed, the temperature was raised to 200–250 degrees centigrade and maintained there for 21 hours. The reaction was then cooled and 465 parts of phenol were added, followed by heating at 147–192 degrees centigrade for 14 hours. The excess phenol was stripped off under water aspirator vacuum. The residual compound was found to contain 3.13 percent of phosphorus. The calculated percentage of phosphorus in $C_{66}H_{63}O_4P$ is 3.3 percent. An infrared scan of phenyl bis[2,4,6-tri(α-methylbenzyl) phenyl] phosphate was consistent for points of structure such as aryl oxygen phosphorous bond, methyl to carbon bond, and P=O bond.

On substitution of equimolar quantities of the compounds 2,4-di(α-methylbenzyl) phenol, 2-α-methylbenzyl phenol, benzyl phenol, 2-α-methylbenzyl-4-methyl phenol, 2-α-methylbenzyl-4-chlorophenol or 2-α-methylbenzyl-4-nonyl phenol, for the 2,4,6-tri(α-methylbenzyl) phenol, the corresponding phosphates are obtained.

EXAMPLE 3

Preparation of diphenyl 2,4,6-tri(α-methylbenzyl) phenyl phosphate

To the apparatus of Example 2 were added 1278 parts of phosphorus oxychloride and 4 parts of anhydrous magnesium chloride. The mixture was brought to reflux, 626 parts of 2,4,6-tri(α-methylbenzyl) phenol added, and reflux maintained for 18 hours. Excess phosphorus oxychloride was then stripped off to a pot temperature of 180 degrees centigrade. The reaction mix was cooled and 670 parts of phenol were added, followed by heating at 100–145 degrees centigrade for 9 hours until the hydrogen chloride evolution ceased. Excess phenol was stripped off under water aspirator vacuum. The residual compound was found to contain 4.91 percent of phosphorus. The calculated percentage of phosphorus in $C_{42}H_{39}O_4P$ is 4.86 percent. The infrared scan made of diphenyl 2,4,6-tri(α-methylbenzyl) phenyl phosphate was consistent for points of structure such as aryl oxygen phosphorus bond, methyl to carbon bond, and P=O bond.

When equimolar quantities of 4-α-methylbenzyl phenol, 2-α-methylbenzyl phenol, 2-α-methylbenzyl-4-chlorophenol or 2-α-methylbenzyl-4-methyl are used to replace the 2,4,6-tri(α-methylbenzyl) phenol, the corresponding phosphates are obtained. In the like manner, when phenol is replaced by cresol, xylenol or nonyl phenol, the corresponding compounds are obtained.

EXAMPLE 4

Preparation of tris(α-methylbenzylphenyl) phosphate

To the apparatus of Example 2 were added 1180 parts of α-methylbenzyl phenol and 178 parts of phosphorus oxychloride. The reactor was heated to 140 degrees centigrade, 1 part of anhydrous magnesium chloride was added and the temperature was maintained at 125–170 degrees centigrade and 225.7 parts of α-methylbenzyl phenol was then stripped under high vacuum. The residual compound was found to contain 4.94 percent of phosphorus. The calculated percentage of the element in $C_{42}H_{39}O_4P$ is 4.86 percent phosphorus. An infrared scan made was consistent with points of structure for tris(α-methylbenzylphenyl) phosphate. Such points were aryl oxygen phosphorus bond, methyl to carbon bond, and P=O bond.

Upon replacement of the α-methylbenzyl phenol by equimolar quantities of 2,4-di(α-methylbenzyl) phenol, 2,4,6 - tri(α - methylbenzyl) phenol, 2-α-methylbenzyl-4-chlorophenol or 2-α-methylbenzyl-4-methyl phenol, the corresponding phosphates are obtained.

EXAMPLE 5

Di(nonylphenyl) α-methylbenzylphenyl phosphate

To the apparatus of Example 2 were added 153.5 parts of phosphorus oxychloride and 1 part of anhydrous magnesium chloride. The mixture was heated to 60 degrees centigrade and 225.7 parts of α-methylbenzyl phenol were added. The temperature was maintained there at 60 degrees centigrade for 1 hour and then raised to reflux for 10 hours. After cooling the reactor to 60 degrees centigrade, 444.2 parts of nonylphenol were added. The mixture was heated for 1 hour at 60 degrees centigrade and 2 hours at 180 degrees centigrade. Unreacted nonylphenol was then stripped off under vacuum. The desired product, namely, dinonylphenyl-α-methylbenzylphenyl phosphate was found to conain 4.13 percent of phosphorus. The calculated percentage of this element in $C_{46.65}H_{61.65}O_4P$ is 4.35 percent. The novel product has the formula:

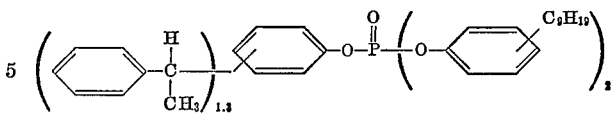

Thus it is a mixture of dinonylphenyl mono(α-methylbenzyl) phenyl phosphate and dinonylphenyl di(α-methylbenzyl) phenyl phosphate in a 2:1 ratio.

EXAMPLE 6

Preparation of tris(α-methylbenzylphenyl) phosphate

To the apparatus of Example 2 are added 1180 parts of α-methylbenzyl phenol and 178 parts of phosphorus oxychloride. The reactor is gradually heated to and maintained between 200 degrees centigrade and 250 degrees centigrade, at about 2 atmospheres of pressure, for about 12 hours. Excess α-methylbenzyl phenol is then stripped under high vacuum. An infrared scan of the residual product is made and is found to be consistent with points of structure for tris(α-methylbenzylphenyl) phosphate. When the reaction is conducted at atmospheric pressure reaction times may range from about 12 hours to 20 hours.

What is claimed is:
1. An organic phosphate of the formula

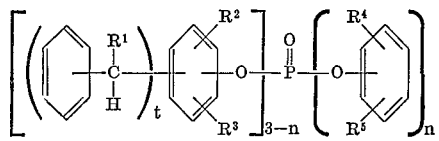

wherein $R^1$ is alkyl of 1 to about 8 carbon atoms; $R^2$, $R^3$, $R^4$, and $R^5$ are independently selected from the group consisting of hydrogen, alkyl of 1 to about 18 carbon atoms, and chlorine; $n$ is from 0 to 2; and $t$ is from 1 to 3.

2. An organic phosphate in accordance with claim 1 wherein $n$ is 0.

3. A mixed organic phosphate in accordance with claim 1 wherein $n$ is 1.

4. Tris(4-α-methylbenzylphenyl) phosphate.

5. Tris(2-α-methylbenzylphenyl) phosphate.

6. Tris[2,4-di(α-methylbenzyl) phenyl] phosphate.

7. Tris[2,4,6-tri(α-methylbenzyl) phenyl] phosphate.

8. Phenyl bis(4-α-methylbenzylphenyl) phosphate.

9. Nonylphenyl bis(4 - α - methylbenzylphenyl) phosphate.

10. Phenyl bis[2,4-di(α-methylbenzyl) phenyl] phosphate.

11. Phenyl bis [2,4,6 - tri(α - methylbenzyl) phenyl] phosphate.

12. Di(nonylphenyl) 4 - α - methylbenzylphenyl phosphate.

13. Di(nonylphenyl) 2 - α - methylbenzylphenyl phosphate.

14. Diphenyl 2,4 - di(α - methylbenzyl) phenyl phosphate.

15. Diphenyl 2,4,6-tri(α-methylbenzyl) phenyl phosphate.

References Cited

UNITED STATES PATENTS 2,225,285    12/1940    Moyle _____ 260—966

CHARLES B. PARKER, *Primary Examiner.*

A. H. SUTTO, *Assistant Examiner.*

U.S. Cl. X.R.

260—30.6, 974, 975

PO-1050
(5/69)

UNITED STATES PATENT OFFICE
CERTIFICATE OF CORRECTION

Patent No. 3,428,714            Dated February 18, 1969

Inventor(s) James S. Sconce, James J. Hodan and William L. Schall

It is certified that error appears in the above-identified patent and that said Letters Patent are hereby corrected as shown below:

Column 5, line 42, should be corrected to read as follows:---centigrade for 12 hours. Excess $\alpha$-methylbenzyl phenol---.
Column 5, line 72, the word after "to" should be corrected to read as---contain---.

SIGNED AND
SEALED
FEB 24 1970

(SEAL)
Attest:

Edward M. Fletcher, Jr.
Attesting Officer

WILLIAM E. SCHUYLER, JR.
Commissioner of Patents